(12) United States Patent
Zhu et al.

(10) Patent No.: US 12,088,091 B2
(45) Date of Patent: Sep. 10, 2024

(54) ELECTROSTATIC DISCHARGE PROTECTION CIRCUIT FOR CHIP

(71) Applicant: CHANGXIN MEMORY TECHNOLOGIES, INC., Hefei (CN)

(72) Inventors: Ling Zhu, Hefei (CN); Kai Tian, Hefei (CN)

(73) Assignee: CHANGXIN MEMORY TECHNOLOGIES, INC., Hefei (CN)

(*) Notice: Subject to any disclaimer, the term of this patent is extended or adjusted under 35 U.S.C. 154(b) by 199 days.

(21) Appl. No.: 17/810,682

(22) Filed: Jul. 5, 2022

(65) Prior Publication Data

US 2023/0007947 A1  Jan. 12, 2023

Related U.S. Application Data

(63) Continuation of application No. PCT/CN2022/088845, filed on Apr. 24, 2022.

(30) Foreign Application Priority Data

Jul. 12, 2021  (CN) .......................... 202110783134.5

(51) Int. Cl.
*H02H 9/04* (2006.01)
*H02H 1/00* (2006.01)

(52) U.S. Cl.
CPC .......... *H02H 9/046* (2013.01); *H02H 1/0007* (2013.01)

(58) Field of Classification Search
CPC .............................. H02H 9/046; H02H 1/0007
USPC .......................................................... 361/56
See application file for complete search history.

(56) References Cited

U.S. PATENT DOCUMENTS

| 8,194,373 | B2 | 6/2012 | Padden |
| 9,425,185 | B2 | 8/2016 | Gauthier, Jr. et al. |
| 10,224,710 | B2 | 3/2019 | Fifield et al. |
| 11,710,962 | B2 * | 7/2023 | Peng ................ H03K 19/00315 |
| | | | 361/56 |
| 2002/0191358 | A1 | 12/2002 | Lee et al. |

(Continued)

FOREIGN PATENT DOCUMENTS

| CN | 101884103 A | 11/2010 |
| CN | 103683235 A | 3/2014 |

(Continued)

OTHER PUBLICATIONS

International Search Report cited in PCT/CN2022/088845 mailed Jul. 7, 2022, 8 pages.

*Primary Examiner* — Dharti H Patel
(74) *Attorney, Agent, or Firm* — Kilpatrick Townsend & Stockton LLP (57) ABSTRACT

The present disclosure provides an electrostatic discharge (ESD) protection circuit for a chip, including: a monitoring unit, configured to generate a trigger signal when there is an ESD pulse on a power supply pad; a plurality of controllable drive units, connected to the monitoring unit, and each of the controllable drive units being configured to switch an operating state under a control of a control signal, wherein the operating state includes an output state, and the output state refers to generating a drive signal according to the trigger signal; and a discharge transistor, connected to the plurality of controllable drive units, and configured to be turned on under a drive of the drive signal so as to discharge an electrostatic charge to the ground pad.

14 Claims, 4 Drawing Sheets

(56) References Cited

U.S. PATENT DOCUMENTS

| | | | |
|---|---|---|---|
| 2008/0123229 A1 | 5/2008 | Choi | |
| 2009/0021872 A1* | 1/2009 | Ker | H01L 27/0266 |
| | | | 361/56 |
| 2015/0380397 A1* | 12/2015 | Dabral | H01L 27/0255 |
| | | | 361/56 |
| 2018/0159318 A1* | 6/2018 | Chen | H02H 1/04 |
| 2019/0341772 A1* | 11/2019 | Hsu | G01R 31/002 |
| 2023/0023642 A1* | 1/2023 | Zhu | H01L 27/0266 |

FOREIGN PATENT DOCUMENTS

| | | | | |
|---|---|---|---|---|
| CN | 113097206 A | | 7/2021 | |
| CN | 217641333 U | * | 10/2022 | H01L 27/0285 |

* cited by examiner

ELECTROSTATIC DISCHARGE PROTECTION CIRCUIT FOR CHIP

CROSS-REFERENCE TO RELATED APPLICATIONS

This is a continuation of International Application No. PCT/CN2022/088845, filed on Apr. 24, 2022, which claims the priority to Chinese Patent Application No. 202110783134.5, titled "ELECTROSTATIC DISCHARGE PROTECTION CIRCUIT FOR CHIP" and filed with the China National Intellectual Property Administration (CNIPA) on Jul. 12, 2021. The entire contents of International Application No. PCT/CN2022/088845 and Chinese Patent Application No. 202110783134.5 are incorporated herein by reference.

TECHNICAL FIELD

The present disclosure relates to the technical field of integrated circuits, and in particular, to an electrostatic discharge (ESD) protection circuit for a chip.

BACKGROUND

Static electricity is everywhere. Without an ESD protection circuit, a chip will soon be damaged, and almost fatally damaged, by static electricity introduced due to various reasons.

Therefore, a chip is usually provided with an ESD protection circuit, which is used to discharge electrostatic charges in a timely manner, to prevent a protected circuit from failing or even burning due to a high voltage caused by the electrostatic charges.

SUMMARY

The present disclosure provides an electrostatic discharge protection circuit for a chip. The chip includes a power supply pad and a ground pad. The electrostatic discharge protection circuit includes:
- a monitoring unit, configured to generate a trigger signal when there is an electrostatic discharge pulse on the power supply pad;
- a plurality of controllable drive units, connected to the monitoring unit, and each of the controllable drive units being configured to switch an operating state under a control of a control signal, wherein the operating state includes an output state, and the output state refers to generating a drive signal according to the trigger signal; and
- a discharge transistor, connected to the plurality of controllable drive units, and configured to be turned on under a drive of the drive signal so as to discharge an electrostatic charge to the ground pad.

BRIEF DESCRIPTION OF THE DRAWINGS

The accompanying drawings incorporated into the specification and constituting part of the specification illustrate the embodiments of the present disclosure, and serve, together with the specification, to explain the principles of the present disclosure.

Specific embodiments of the present application are shown by using the accompanying drawings and are described below in more detail. The accompanying drawings and text description are not intended to limit the scope of the concept of the present application in any manner, but to explain the concept of the present application for those skilled in the art with reference to specific embodiments.

DETAILED DESCRIPTION

Exemplary embodiments are described in detail herein, and examples thereof are represented in the accompanying drawings. When the following descriptions relate to the accompanying drawings, unless otherwise stated, same numerals in different accompanying drawings represent same or similar elements. Implementations described in the following exemplary embodiments do not represent all implementations consistent with the present disclosure. On the contrary, the implementations are merely examples of apparatuses and methods that are described in detail in the appended claims and consistent with some aspects of the present disclosure.

Those skilled in the art may easily figure out other implementation solutions of the present disclosure after considering the specification and practicing the invention disclosed herein. The present disclosure is intended to cover any variations, purposes or applicable changes of the present disclosure. Such variations, purposes or applicable changes follow the general principle of the present disclosure and include common knowledge or conventional technical means in the technical field which is not disclosed in the present disclosure. The specification and embodiments are merely considered as illustrative, and the real scope and spirit of the present disclosure are pointed out by the appended claims.

Figure 1:
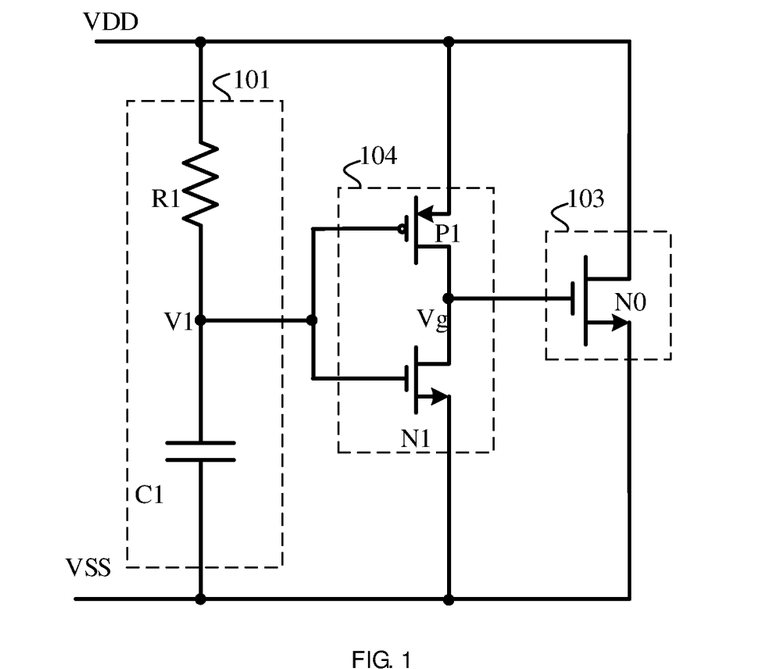
FIG. 1 is a specific circuit diagram of an ESD protection circuit for a chip according to one embodiment of the present disclosure.

FIG. 1 shows an ESD protection circuit for a chip according to one embodiment of the present disclosure. The chip includes a power supply pad VDD and a ground pad VSS. The ESD protection circuit includes a monitoring unit 101, a drive unit 104, and a discharge transistor 103. The monitoring unit 101 is located between the power supply pad and the ground pad. The drive unit 104 is connected to the monitoring unit 101 and also connected to the discharge transistor.

The monitoring unit 101 is configured to generate a trigger signal when there is an ESD pulse on the power supply pad VDD. The drive unit 104 is configured to generate a drive signal according to the trigger signal, and the drive signal is configured to control the discharge transistor 103 to be turned on, so as to timely discharge an electrostatic charge on the power supply pad VDD to the ground pad VSS.

In one embodiment, the monitoring unit 101 includes a monitoring resistor R1 and a monitoring capacitor C1. The monitoring resistor R1 is provided with a first terminal connected to the power supply pad VDD and a second terminal successively connected to a first terminal of the monitoring capacitor C1 and the drive unit 104, and the monitoring capacitor C1 is provided with a second terminal connected to the ground pad VSS.

In one embodiment, the drive unit 104 includes a first drive transistor P1 and a second drive transistor N1. The first drive transistor P1 is provided with a first terminal connected to the power supply pad VDD and a second terminal successively connected to a first terminal of the second drive transistor N1 and a control terminal of the discharge transistor 103, and the second drive transistor N1 is provided with a second terminal connected to the ground pad VSS.

When there is an ESD pulse on the power supply pad VDD, an impedance of the monitoring capacitor C1 decreases, and a voltage at the first terminal V1 of the monitoring resistor C1 also decreases, so as to control the first drive transistor P1 to be turned on and the second drive transistor N1 to be turned off. A voltage at the second terminal Vg of the first drive transistor P1 is pulled to a high level, and the discharge transistor NO is also turned on, so that the discharge transistor NO discharges the electrostatic charge on the power supply pad to the ground pad VSS.

A ratio between a size of the first drive transistor P1 and a size of the second drive transistor N1 determines a terminal voltage at the second terminal Vg of the first drive transistor P1. The greater the ratio between the size of the first drive transistor P1 and the size of the second drive transistor N1 is, the stronger a pull-up capability of the drive unit is, and the stronger a discharge capability of the discharge transistor NO is. However, electric leakage of the chip in a power-on process is also greater. Therefore, the ratio between the size of the first drive transistor P1 and the size of the second drive transistor N1 greatly affects the capability of ESD protection for the chip. Multiple tests are required to determine an appropriate ratio.

In addition, the ESD protection circuit shown in FIG. 1 usually needs to be taped out together with an internal circuit of the chip to test a level of ESD protection for the chip. If the capability of ESD protection for the chip is found to be weaker, the size of the first drive transistor P1 and the size of the second drive transistor N1 need to be designed again, and the capability of ESD protection for the chip is tested after the tape-out.

However, the tape-out cost of the chip is expensive. If the capability of ESD protection for the chip is tested to be weaker, the size of the two drive transistors needs to be designed again, and testing is performed again after the tape-out, which lead to a complicated test process and a high test cost.

The present disclosure provides another ESD protection circuit for a chip, intended to reduce the test cost of ESD protection for a chip. The technical concept of the present disclosure is as follows: a plurality of controllable drive units are provided in the ESD protection circuit, and before the capability of ESD protection is tested for the ESD protection circuit, the number of controllable drive units in the output state in the ESD protection circuit is set through the control signal, so as to achieve the discharge capability of the discharge transistor and the capability of ESD protection of the ESD protection circuit. A plurality of chips are produced through one tape-out, the capability of ESD protection of the ESD protection circuit is set according to test requirements, and multiple groups of ESD protection circuits having different capabilities of ESD protection are obtained without multiple tape-outs, thereby reducing the test cost of ESD protection and simplifying the test process of ESD protection for a chip.

Figure 2:
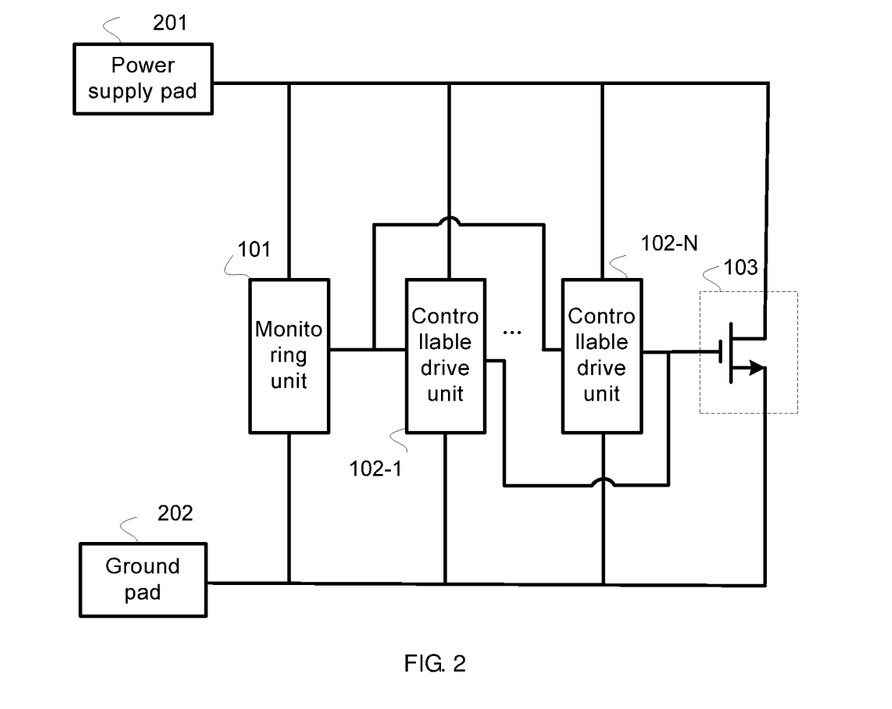
FIG. 2 is a structural block diagram of an ESD protection circuit for a chip according to one embodiment of the present disclosure.

As shown in FIG. 2, the present disclosure provides an ESD protection circuit for a chip. The chip includes a power supply pad 201 and a ground pad 202. The ESD protection circuit includes a monitoring unit 101, a plurality of controllable drive units, and a discharge transistor 103. The plurality of controllable drive units are marked as a controllable drive unit 102-1, a controllable drive unit 102-2, . . . and a controllable drive unit 102-N, and N is a positive integer greater than 1.

The monitoring unit 101 is connected between the power supply pad 201 and the ground pad 202 and configured to generate a trigger signal when there is an ESD pulse on the power supply pad 201. The controllable drive unit 102-1, a controllable drive unit 102-2, . . . and a controllable drive unit 102-N are all connected to the monitoring unit 101, and each controllable drive unit is configured to switch an operating state on the basis of a control signal.

The control signal may be an electrical signal or other signal that is not affected by power failure of the chip, such as a laser signal. When each controllable drive unit can output the drive signal according to the trigger signal, the controllable drive unit is in an output state. When each controllable drive unit cannot output the drive signal, the controllable drive unit is in an output stop state.

For any controllable drive unit, the control signal can switch the operating state of the controllable drive unit, for example, switching the controllable drive unit from the output state to the output stop state. After the control signal changes the operating state of the controllable drive unit, the controllable drive unit does not need the control signal to maintain the operating state, so as to ensure that the operating state of the controllable drive unit in the chip remains unchanged when the chip is in a power-off state during the test process.

The discharge transistor 103 is connected to each controllable drive unit and configured to be turned on under the drive of the drive signal, so as to discharge the electrostatic charge to the ground pad 202. The greater the number of drive signals received by the discharge transistor 103 is, the faster the turn-on rate of the discharge transistor 103 is, the stronger the discharge capability of the discharge transistor 103 is, and the stronger the capability of ESD protection of the ESD protection circuit is.

A plurality of chips are produced through one tape-out and divided into a plurality of groups. Before electrostatic test, the operating state of the controllable drive units is switched through the control signal, so that the number of controllable drive units in the output state in each group of chips is different, and the turn-on rate of the discharge transistor 103 in each group of chips is also different. However, the turn-on rate will affect the discharge rate of the discharge transistor 103, and the capability of ESD protection of the ESD protection circuit for each group of chips is different. Then the configured chips are tested to select the ESD protection circuit having the best capability of ESD protection, without multiple tape-outs, thereby reducing the test cost of ESD protection and simplifying the test process of ESD protection for a chip.

Figure 3:
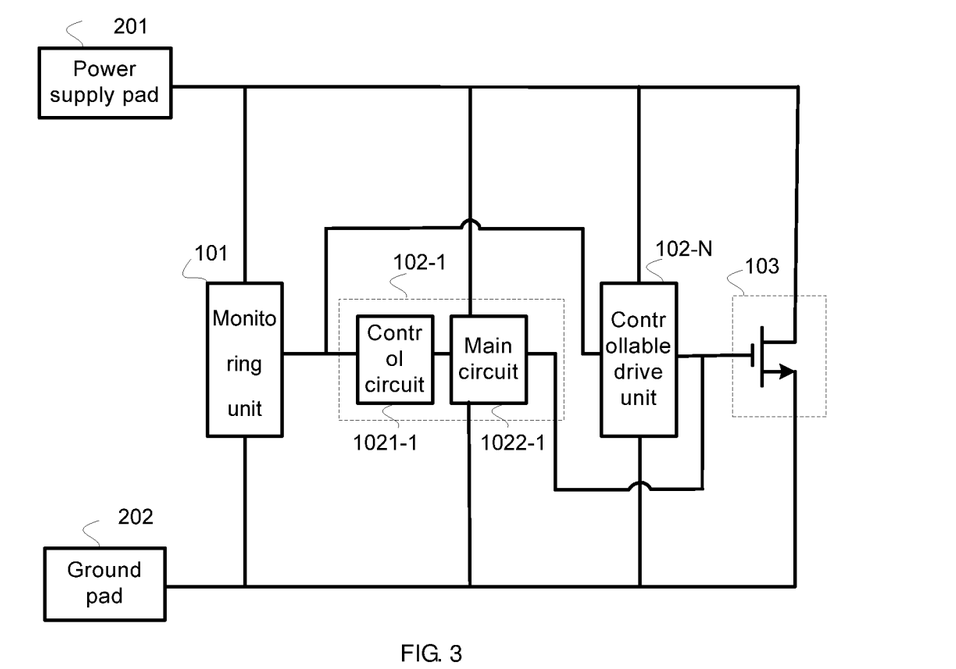
FIG. 3 is a structural block diagram of an ESD protection circuit for a chip according to another embodiment of the present disclosure.

In one embodiment, referring to FIG. 3, by taking the controllable drive unit 102-1 as an example, a circuit structure in the controllable driving unit is described, and other controllable units are the same as the controllable drive unit 102-1. Therefore, details are not described herein again. The controllable drive unit 102-1 includes a main circuit 1022-1 and a control circuit 1021-1. The main circuit 1022-1 is connected to the monitoring unit 101, and the control circuit 1021-1 is connected to the main circuit 1022-1. The main circuit 1022-1 switches the operating state under the control of the control circuit 1021-1. For example, the operating state where the main circuit generates the drive signal according to the trigger signal is called the output state, and the operating state where the main circuit does not output the drive signal is called the output stop state. More specifically, the operating state of the control circuit 1021-1 is switched on the basis of the control signal, and switching the operating state of the control circuit 1021-1 makes the main circuit switched from the output state to the output stop state, or makes the main circuit switched from the output stop state to the output state.

In one embodiment, still referring to FIG. 3, the main circuit 1022-1 is connected between the power supply pad 201 and the ground pad 202 and connected to the output terminal of the monitoring unit 101 through the control circuit 1021-1, and the control circuit 1021-1 can turn on or turn off a path between the main circuit 1022-1 and the monitoring unit 101. When the operating state of the control circuit 1021-1 is switched on the basis of the control signal, and the control circuit 1021-1 is in the operating state of turning on the path between the main circuit 1022-1 and the monitoring unit 101, the main circuit 1022-1 is in the output state. When the operating state of the control circuit 1021-1 is switched on the basis of the control signal, and the control circuit 1021-1 is in the operating state of turning off the path between the main circuit 1022-1 and the monitoring unit 101, the main circuit 1022-1 is in the output stop state.

By providing the control circuit 1021-1 between the main circuit 1022-1 and the output terminal of the monitoring unit 101, and setting the operating state of the control circuit according to test requirements, the path between the main circuit 1022-1 and the monitoring unit 101 is turned off or turned on to cure the operating state of the controllable drive unit, thereby achieving the capability of ESD protection of the ESD protection circuit according to the test requirements.

Figure 4:
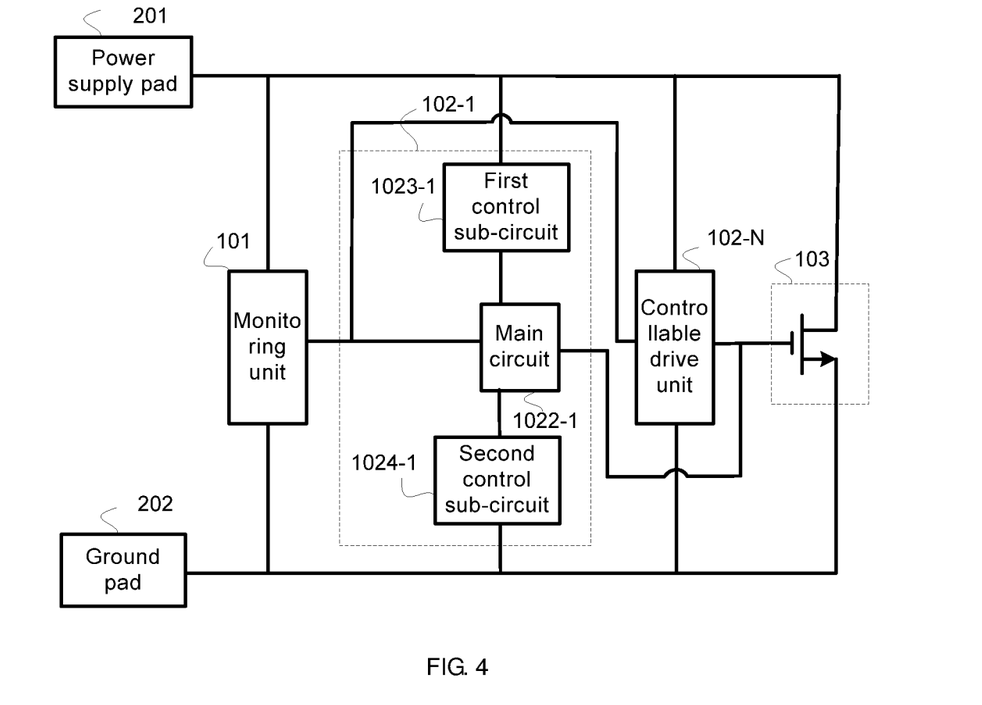
FIG. 4 is a structural block diagram of an ESD protection circuit for a chip according to another embodiment of the present disclosure.

In one embodiment, referring to FIG. 4, by taking the controllable drive unit 102-1 as an example, a circuit structure in the controllable driving unit is described, and other controllable units are the same as the controllable drive unit 102-1. Therefore, details are not described herein again. The controllable drive unit 102-1 includes a main circuit 1022-1 and a control circuit 1021-1. The main circuit 1022-1 is connected to the monitoring unit 101, and the control circuit 1021-1 is connected to the main circuit 1022-1. The control circuit 1021-1 includes a first control sub-circuit 1023-1 and a second control sub-circuit 1024-1. The main circuit 1022-1 is connected to the power supply pad 201 through the first control sub-circuit 1023-1 and is connected to the ground pad 202 through the second control sub-circuit 1024-1.

The first control sub-circuit 1023-1 and the second control sub-circuit 1024-1 can turn on or turn off a path between the main circuit 1022-1 and the power supply pad 201 or between the main circuit 1022-1 and the ground pad 202. When the operating state of the first control sub-circuit 1023-1 and the second control sub-circuit 1024-1 is switched on the basis of the control signal, and the first control sub-circuit 1023-1 and the second control sub-circuit 1024-1 are in the operating state of turning on the path between the main circuit 1022-1 and the power supply pad 201 or between the main circuit 1022-1 and the ground pad 202, the main circuit 1022-1 is in the output state. When the operating state of the first control sub-circuit 1023-1 and the second control sub-circuit 1024-1 is switched on the basis of the control signal, and the first control sub-circuit 1023-1 and the second control sub-circuit 1024-1 are in the operating state of turning off the path between the main circuit 1022-1 and the power supply pad 201 or between the main circuit 1022-1 and the ground pad 202, the main circuit 1022-1 is in the output stop state.

By providing the first control sub-circuit 1023-1 between the main circuit 1022-1 and the power supply pad 201, providing the second control sub-circuit 1024-1 between the main circuit 1022-1 and the ground pad 202, and setting the operating state of the first control sub-circuit 1023-1 and the second control sub-circuit 1024-1 according to the test requirements, the path between the main circuit 1022-1 and the power supply pad 201 or between the main circuit 1022-1 and the ground pad 202 is turned off or turned on to cure the operating state of the controllable drive unit, thereby achieving the capability of ESD protection of the ESD protection circuit according to the test requirements.

Figure 5:
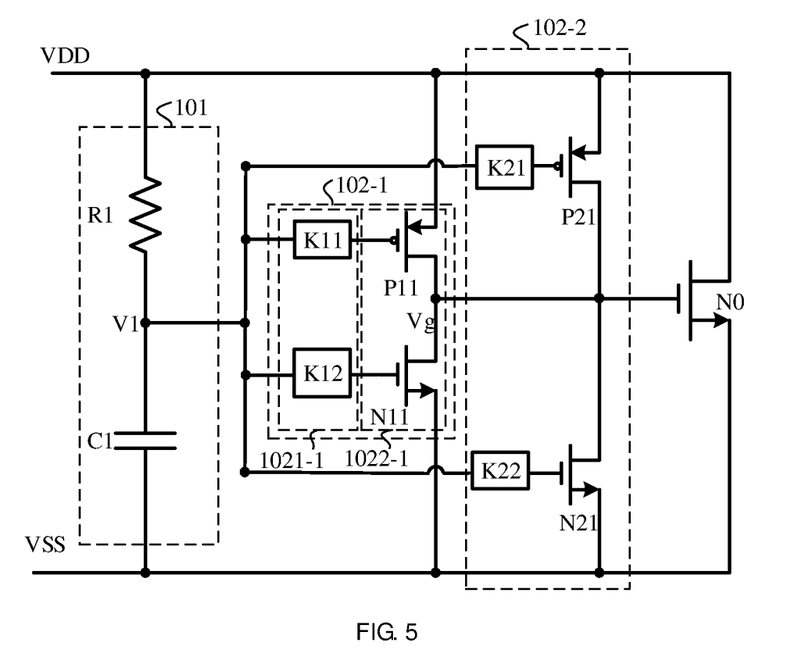
FIG. 5 is a specific circuit diagram of an ESD protection circuit for a chip according to one embodiment of the present disclosure.

As shown in FIG. 5, the present disclosure provides an ESD protection circuit for a chip. The ESD protection circuit for a chip includes a monitoring unit 101, a plurality of controllable drive units, and a discharge transistor N0. The plurality of controllable drive units are marked as a controllable drive unit 102-1, a controllable drive unit 102-2, ... and a controllable drive unit 102-N, and N is a positive integer greater than 1. This figure only shows the drive unit 102-1 and the drive unit 102-2, and other drive units have a same circuit structure as the drive unit 102-1 and the drive unit 102-2. Therefore, details are not described herein again.

The monitoring unit 101 includes a monitoring capacitor C1 and a monitoring resistor R1. The monitoring capacitor C1 is provided with a first terminal and a second terminal, and the monitoring resistor R1 is also provided with a first terminal and a second terminal. The first terminal of the monitoring resistor R1 is connected to the power supply pad VDD. The second terminal of the monitoring capacitor C1 is connected to the ground pad VSS. The second terminal of the monitoring resistor R1 and the first terminal V1 of the monitoring capacitor C1 are connected to each other as an output terminal of the monitoring unit 101.

By taking the controllable drive unit 102-1 as an example, the circuit structure and operating principle thereof will be described below.

The controllable drive unit 102-1 includes a main circuit 1022-1 and a control circuit 1021-1, and the main circuit 1022-1 is connected to the output terminal of the monitoring unit 101 through the control circuit 1021-1.

In one embodiment, the main circuit 1022-1 includes a first drive transistor P11 and a second drive transistor N11, each provided with a first terminal, a second terminal, and a control terminal.

The first terminal of the first drive transistor P11 is connected to the power supply pad VDD. The second terminal of the second drive transistor N11 is connected to the ground pad VSS. The second terminal of the first drive transistor P11 and the first terminal of the second drive transistor N11 are connected to each other and then connected to a control terminal of the discharge transistor N0. The control terminal of the first drive transistor P11 and the control terminal of the second drive transistor N11 are connected to each other and then connected to the output terminal of the monitoring unit 101 through the control circuit 1021-1.

In one embodiment, the control circuit 1021-1 includes a first switch K11 and a second switch K12, each provided with a first terminal and a second terminal.

The first switch K11 is provided with the first terminal connected to the output terminal of the monitoring unit 101 and the second terminal connected to the control terminal of the first drive transistor P11, and configured to be switched from an on state to an off state or from the off state to the on state under the control of the control signal.

The second switch K12 is provided with the first terminal connected to the output terminal of the monitoring unit 101 and the second terminal connected to the control terminal of the second drive transistor N11, and configured to be switched from an on state to an off state or from the off state to the on state under the control of the control signal.

The first drive transistor P11 and the second drive transistor N11 pull the voltage at the second terminal Vg of the second drive transistor N11 under the control of the trigger signal, to control the discharge transistor N0 to be turned on or turned off.

In one embodiment, the first drive transistor P11 is a P-type transistor, and the second drive transistor N11 and the discharge transistor N0 are N-type transistors.

In one embodiment, the discharge transistor N0 is larger than the second drive transistor N11.

In one embodiment, the size of the first drive transistor in the k-th controllable drive unit is twice the size of the first drive transistor in the (k−1)-th controllable drive unit. That is, when a drive current outputted by the first drive transistor in the k-th controllable drive unit is $2^k \times i_{b1}$, a drive current outputted by the first drive transistor in the (k−1)-th controllable drive unit is $2^{k-1} \times i_{b1}$, where ib1 is a current reference value.

In one embodiment, the size of the second drive transistor in the k-th controllable drive unit is twice the size of the second drive transistor in the (k−1)-th controllable drive unit. That is, when a drive current outputted by the second drive transistor in the k-th controllable drive unit is $2^k \times i_{b2}$, a drive current outputted by the second drive transistor in the (k−1)-th controllable drive unit is $2^{k-1} \times i_{b2}$, where ib2 is a current reference value.

After a plurality of chips are produced through one tape-out, the chips are divided into a plurality of groups, marked as a first group of chips, a second group of chips, a third group of chips, . . . , and an M-th group of chips, and there are Q chips in each group. This is just an example, and the number of chips in each group may also be different.

The number of controllable drive units in the output state in the M groups of chips is determined according to the test requirements. It is assumed that the numbers of controllable drive units in the output state in the first group of chips, the second group of chips, . . . , and the M-th group of chips are I1, I2, . . . , and IM. Before the test, for the first group of chips, when an initial operating state of the first switch and the second switch in each controllable drive unit of each chip makes the main circuit 1022 in the output state, the control signal is sent to the first switch and the second switch in Q-I1 controllable drive units, so that the main circuit in the Q-I1 controllable drive units is in the output stop state, and the number of controllable drive units in the output state in each chip of the first group of chips is set to be I1. When the initial operating state of the first switch and the second switch in each controllable drive unit of each chip makes the main circuit 1022 in the output stop state, the control signal is sent to the first switch and the second switch in I1 controllable drive units, so that the main circuit in the I1 controllable drive units is in the output state, and the number of controllable drive units in the output state in each chip of the first group of chips is set to be I1.

The setting modes of the controllable drive units in other groups of chips are the same. Therefore, details are not described herein again.

After setting the number of controllable drive units in the output state in each group of chips, the test of ESD protection is performed on each group of chips to determine an ESD protection circuit having the best capability of ESD protection from each group of chips.

When the sizes of the first drive transistors in each controllable drive unit are different, and the size of the drive transistor in the k-th controllable drive unit is twice the size of the corresponding drive transistor in the (k−1)-th controllable drive unit, the controllable drive unit in the operating state can be controlled according to the size of the drive transistor in each drive unit, thereby adjusting the turn-on rate of the discharge transistor N0; and the number of adjustment steps of the turn-on rate is more, facilitating selecting a better ESD protection circuit.

In one embodiment, the first switch and the second switch are one-time programmable memories. By performing programming control on the one-time programmable memories, the path between the control terminal of the first drive transistor and the first terminal of the monitoring capacitor is controlled to be turned off, and the path between the control terminal of the second drive transistor N1 and the first terminal of the monitoring capacitor C1 is controlled to be turned off, so that the controllable drive unit is switched from the output state to the output stop state, the capability of ESD protection of the ESD protection circuit is adjusted, and the test of electrostatic capability is performed on the chip.

Because electrostatic breakdown usually occurs under power failure, and the use of a circuit to generate a control signal to control the turn-on or turn-off of a switch cannot be applied when the chip is under power failure, the operating state of the controllable drive unit is switched by performing programming control on a one-time programmable device, the capability of ESD protection of the ESD protection circuit is adjusted, and the operating state of the controllable drive unit 102 can be maintained without making the chip in a charged state, so that chips having ESD protection circuits of different structures are obtained through test requirements, and then the capability of ESD protection is tested for the chips.

In one embodiment, the first switch and the second switch are laser fuse devices. Universal laser irradiates the laser fuse devices in the controllable drive units, so that the controllable drive units are switched from the output state to the output stop state, and the number of controllable drive units in the output state in the chip is changed, so as to set the capability of ESD protection for the chip according to the test requirements.

Figure 6:
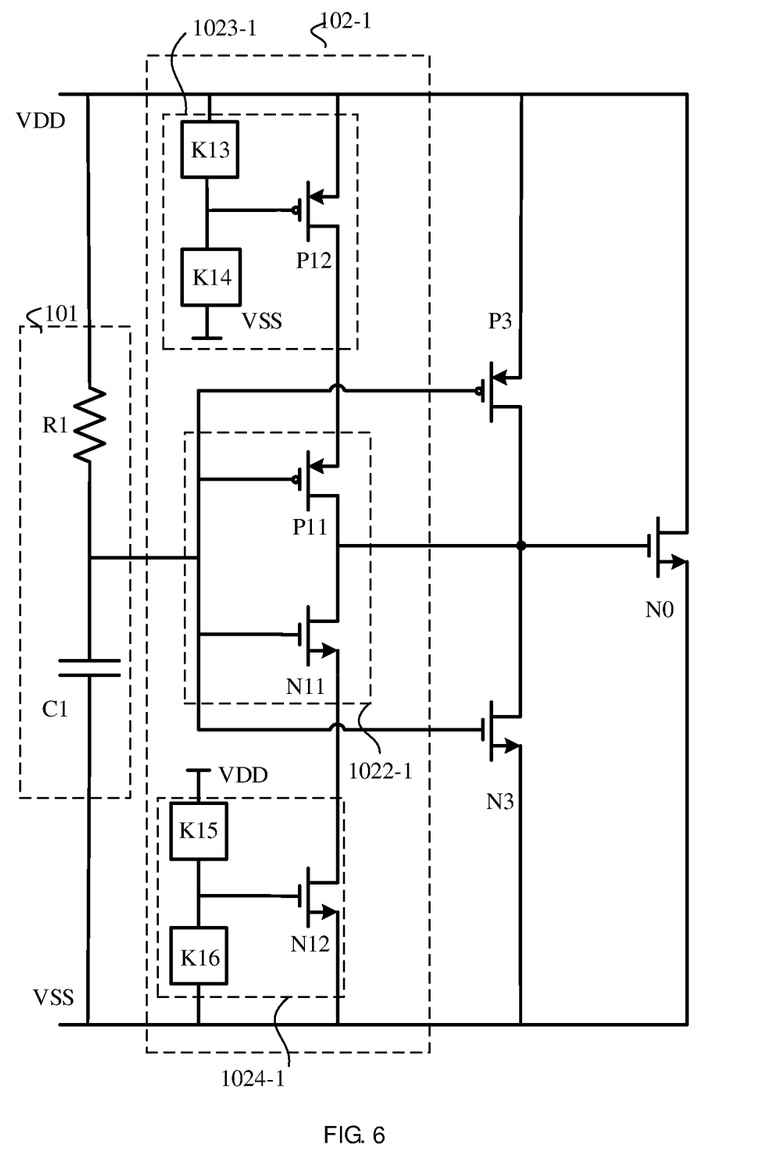
FIG. 6 is a specific circuit diagram of an ESD protection circuit for a chip according to one embodiment of the present disclosure.

As shown in FIG. 6, the present disclosure provides an ESD protection circuit for a chip. The ESD protection circuit for a chip includes a monitoring unit 101, a plurality of controllable drive units 102, and a discharge transistor N0. The plurality of controllable drive units are marked as a controllable drive unit 102-1, a controllable drive unit 102-2, . . . and a controllable drive unit 102-N, and N is a positive integer greater than 1. This figure only shows the drive unit 102-1, and other drive units have a same circuit structure as the drive unit 102-1. Therefore, details are not described herein again.

A structure of the monitoring unit 101 is the same as that in FIG. 4. Therefore, details are not described herein again.

Each controllable drive unit 102 includes a main circuit 1022-1 and a control circuit 1021-1, and the control circuit 1021-1 also includes a first control sub-circuit 1023-1 and a second control sub-circuit 1024-1. The main circuit 1022-1 is connected to the output terminal of the monitoring unit 101 and connected to the power supply pad VDD through the first control sub-circuit 1023-1. The first control sub-circuit 1023-1 controls the path between the main circuit 1022-1 and the power supply pad VDD. The main circuit 1022-1 is connected to the ground pad VSS through the second control sub-circuit 1024-1. The second control sub-circuit 1024-1 controls the path between the main circuit and the ground pad VSS.

In one embodiment, the main circuit 1022-1 includes a first drive transistor P11 and a second drive transistor N11. The first drive transistor P11 is provided with a control terminal connected to the output terminal of the monitoring unit 101, and the second drive transistor N11 is also provided with a control terminal connected to the output terminal of the monitoring unit 101. A second terminal of the first drive transistor P11 is connected to the first terminal of the second drive transistor N11 and then connected to the control terminal of the discharge transistor NO.

The first control sub-circuit 1023-1 includes a first control transistor P12, a third switch K13, and a fourth switch K14. The first control transistor P12 is provided with a first terminal connected to the power supply pad VDD, a second terminal connected to the first terminal of the first drive transistor P11, and a control terminal connected to the power supply pad VDD through the third switch K13 and connected to the ground pad VSS through the fourth switch K14.

The second control sub-circuit 1024-1 includes a second control transistor N112, a fifth switch K15, and a sixth switch K16. The second control transistor N112 is provided with a first terminal connected to the second terminal of the second drive transistor N11, a second terminal connected to the ground pad VSS, and a control terminal connected to the power supply pad VDD through the fifth switch K15 and connected to the ground pad VSS through the sixth switch K16.

After a plurality of chips are produced through one tape-out, the chips are divided into a plurality of groups, marked as a first group of chips, a second group of chips, a third group of chips, . . . , and an M-th group of chips, and there are Q chips in each group.

The number of controllable drive units in the output state in the M groups of chips is determined according to the test requirements. It is assumed that the numbers of controllable drive units in the output state in the first group of chips, the second group of chips, . . . , and the M-th group of chips are I1, I2, . . . , and IM.

Before the test, for the first group of chips, when an initial operating state of the third switch and the fourth switch in each controllable drive unit of each chip makes the control terminal of the first control transistor connected to the ground pad and the power supply pad, and an initial operating state of the fifth switch and the sixth switch makes the control terminal of the second control transistor connected to the ground pad and the power supply pad, the control signal is sent to the fourth switch and the fifth switch in I1 controllable drive units, and the control signal is sent to the third switch and the sixth switch in Q-I1 controllable drive units, so that the main circuit in the Q-I1 controllable drive units is in the output stop state, the main circuit in the I1 controllable drive units is in the output state, and the number of controllable drive units in the output state in the first group of chips is I1.

Before the test, for the first group of chips, when the initial operating state of the third switch and the fourth switch in each controllable drive unit of each chip makes the control terminal of the first control transistor connected to the ground pad and the power supply pad, and the initial operating state of the fifth switch and the sixth switch makes the control terminal of the second control transistor connected to the ground pad and the power supply pad, the control signal is sent to the fourth switch and the fifth switch in Q-I1 controllable drive units, and the control signal is sent to the third switch and the sixth switch in I1 controllable drive units, so that the main circuit in the Q-I1 controllable drive units is in the output stop state, the main circuit in the I1 controllable drive units is in the output state, and the number of controllable drive units in the output state in the first group of chips is I1.

The setting modes of the controllable drive units in other groups of chips are the same. Therefore, details are not described herein again.

After setting the number of controllable drive units in the output state in each group of chips, the test of ESD protection is performed on each group of chips to determine an ESD protection circuit having the best capability of ESD protection so as to from each group of chips.

In one embodiment, the first drive transistor P11 is a P-type transistor, and the second drive transistor N11 and the discharge transistor NO are N-type transistors. The first control transistor P12 is a P-type transistor, and the second control transistor N112 is an N-type transistor.

In one embodiment, a size of the first control transistor P12 is the same as a size of the first drive transistor P11, and a size of the second control transistor N112 is the same as a size of the second drive transistor N11. Through such settings, a current capacity of the control transistors and a current capacity of the drive transistors can be fully utilized.

In one embodiment, the third switch, the fourth switch, the fifth switch and the sixth switch are one-time programmable memories.

In one embodiment, the third switch, the fourth switch, the fifth switch and the sixth switch are laser fuse devices.

In one embodiment, the ESD protection circuit further includes several uncontrollable drive units, each of which includes a third drive transistor P3 and a fourth drive transistor N3. A first terminal of the third drive transistor P3 is connected to the power supply pad VDD. A second terminal of the fourth drive transistor N3 is connected to the ground pad VSS. A second terminal of the third drive transistor P3 and a first terminal of the fourth drive transistor N3 are connected to each other and then connected to the control terminal of the discharge transistor NO.

In one embodiment, the third drive transistor P3 is a P-type transistor, and the fourth drive transistor N3 is an N-type transistor.

At least one drive signal needs to be generated in the ESD protection circuit to control the turn-on of the discharge transistor NO. By providing the uncontrollable drive units in the ESD protection circuit to provide the most basic drive signal, the number of switches used in the ESD protection circuit can be reduced, thereby simplifying the structure of the ESD protection circuit.

The present disclosure also provides a test method for a capability of ESD protection for a chip. The test method includes:

S301, obtain a set number of controllable drive units in an output state in each chip of several groups of chips.

In this step, after several chips including the ESD protection circuit described in the above embodiment are produced through one tape-out, the several chips are divided into a plurality of groups, and the set number of controllable drive units in the output state in each group of chips is determined according to test requirements.

The number of controllable drive units in the output state in each chip of any two groups of chips is different, and the number of controllable drive units in the output state in each chip of the same group of chips is the same.

For example, in 3 groups of chips, there are 10 chips in each group, there is 1 controllable drive unit in the output state in 10 chips in the first group of chips, there are 2 controllable drive units in the output state in 10 chips in the second group of chips, and there are 3 controllable drive units in the output state is 10 chips in the third group of chips.

S302, generate a control signal for each chip in the plurality of groups of chips according to the set number of controllable drive units in the output state in each chip of the several groups of chips.

In this step, the control signal is configured to switch the operating state of the controllable drive units.

S303, send the control signal to each chip in the plurality of groups of chips, so as to set the number of controllable drive units in the output state in each chip as the set number.

In this step, when the switch in each controllable drive unit in each chip is a one-time programmable device, the control signal is sent to the corresponding one-time programmable device, so as to set the operating state of each controllable drive unit in each chip.

In one embodiment, if the one-time programmable device is a laser fuse device, laser is emitted to the corresponding laser fuse device, so as to set the operating state of each controllable drive unit in each chip.

S304, perform an electrostatic test on the plurality of groups of chips, and determine an optimal number of controllable drive units in the output state according to a test result.

In this step, the number of controllable drive units in the output state in the chip having the best test result is obtained as the optimal number of controllable drive units in the output state. The ESD protection circuit for a chip is designed according to the optimal number of controllable drive units in the output state, so that the number of drive units in the ESD protection circuit is the optimal number of controllable drive units in the output state.

When evaluating the test result, each test performance parameter of the chip can be classified into grades, the grade of each performance parameter of the chip can be determined, and the grade of each performance parameter of the chip can be weighted and averaged to obtain the performance grade of the chip. The chip having the highest performance grade is taken as the chip having the best test result.

In the above technical solution, a plurality of chips are produced through one tape-out, and the operating states of the controllable drive units are set for each group of chips to ensure that the number of controllable drive units in the output state of each group of chips is different, and the chips having different performance of ESD protection is obtained. Then the electrostatic test is performed on the chips, and the optimal ESD protection circuit is obtained according to the test result. Compared with the mode of updating the capability of ESD protection for the chips by using multiple tape-outs, this solution can only use one tape-out, thereby reducing the test cost and simplifying the test flow.

It should be noted that the present disclosure is not limited to the precise structures described above and shown in the accompanying drawings, and can be modified and changed in many ways without departing from the scope of the present disclosure. The scope of the present disclosure is defined by the appended claims.

The invention claimed is:

1. An electrostatic discharge protection circuit for a chip, wherein the chip comprises a power supply pad and a ground pad, and the electrostatic discharge protection circuit comprises:
   a monitoring unit, configured to generate a trigger signal when there is an electrostatic discharge pulse on the power supply pad;
   a plurality of controllable drive units, connected to the monitoring unit, and each of the controllable drive units being configured to switch an operating state under a control of a control signal, wherein the operating state comprises an output state, and the output state refers to generating a drive signal according to the trigger signal; and
   a discharge transistor, connected to the plurality of controllable drive units, and configured to be turned on under a drive of the drive signal so as to discharge an electrostatic charge to the ground pad; and,
   wherein each of the controllable drive units comprises:
   a main circuit, configured to generate the drive signal according to the trigger signal when in the output state; and a control circuit, connected to the main circuit, and configured to switch an operating state of the main circuit according to the control signal, wherein the operating state of the main circuit comprises an output state.

2. The electrostatic discharge protection circuit according to claim 1, wherein
   the main circuit is connected between the power supply pad and the ground pad; and
   the main circuit is connected to an output terminal of the monitoring unit through the control circuit.

3. The electrostatic discharge protection circuit according to claim 2, wherein the main circuit comprises:
   a first drive transistor, provided with a first terminal connected to the power supply pad; and
   a second drive transistor, provided with a first terminal connected to a second terminal of the first drive transistor and a second terminal connected to the ground pad.

4. The electrostatic discharge protection circuit according to claim 3, wherein the control circuit comprises:
   a first switch, provided with a first terminal connected to the output terminal of the monitoring unit and a second terminal connected to a control terminal of the first drive transistor, and configured to be switched from an on state to an off state or from the off state to the on state under the control of the control signal; and
   a second switch, provided with a first terminal connected to the output terminal of the monitoring unit and a second terminal connected to a control terminal of the second drive transistor, and configured to be switched from an on state to an off state or from the off state to the on state under the control of the control signal.

5. The electrostatic discharge protection circuit according to claim 4, wherein the first switch, the second switch, a third switch, a fourth switch, a fifth switch and a sixth switch are one-time programmable memories.

6. The electrostatic discharge protection circuit according to claim 5, wherein the first switch, the second switch, the third switch, the fourth switch, the fifth switch and the sixth switch are laser fuse devices.

7. The electrostatic discharge protection circuit according to claim 3, wherein the first drive transistor is a P-type transistor, and the second drive transistor and the discharge transistor are N-type transistors.

8. The electrostatic discharge protection circuit according to claim 1, wherein the control circuit comprises a first control sub-circuit and a second control sub-circuit;
the main circuit is connected to an output terminal of the monitoring unit; and
the main circuit is connected to the power supply pad through the first control sub-circuit, and the main circuit is connected to the ground pad through the second control sub-circuit.

9. The electrostatic discharge protection circuit according to claim 8, wherein the main circuit comprises:
a first drive transistor, provided with a control terminal connected to the output terminal of the monitoring unit; and
a second drive transistor, provided with a first terminal connected to a second terminal of the first drive transistor and a control terminal connected to the output terminal of the monitoring unit.

10. The electrostatic discharge protection circuit according to claim 9, wherein the first control sub-circuit comprises:
a first control transistor, provided with a first terminal connected to the power supply pad and a second terminal connected to a first terminal of the first drive transistor;
a third switch, provided with a first terminal connected to the power supply pad and a second terminal connected to a control terminal of the first control transistor, and configured to be switched from an on state to an off state or from the off state to the on state under the control of the control signal; and
a fourth switch, provided with a first terminal connected to the control terminal of the first control transistor and a second terminal connected to the ground pad, and configured to be switched from an on state to an off state or from the off state to the on state under the control of the control signal.

11. The electrostatic discharge protection circuit according to claim 10, wherein the second control sub-circuit comprises:
a second control transistor, provided with a first terminal connected to a second terminal of the second drive transistor and a second terminal connected to the ground pad;
a fifth switch, provided with a first terminal connected to the power supply pad and a second terminal connected to a control terminal of the second control transistor, and configured to be switched from an on state to an off state or from the off state to the on state under the control of the control signal; and
a sixth switch, provided with a first terminal connected to the control terminal of the second control transistor and a second terminal connected to the ground pad, and configured to be switched from an on state to an off state or from the off state to the on state under the control of the control signal.

12. The electrostatic discharge protection circuit according to claim 10, wherein the first control transistor is a P-type transistor, and a second control transistor is an N-type transistor.

13. The electrostatic discharge protection circuit according to claim 12, wherein a size of the first control transistor is the same as a size of the first drive transistor, and a size of the second control transistor is the same as a size of the second drive transistor.

14. The electrostatic discharge protection circuit according to claim 1, wherein the monitoring unit comprises:
a monitoring resistor, provided with a first terminal connected to the power supply pad; and
a monitoring capacitor, provided with a first terminal, used as an output terminal of the monitoring unit after connected to a second terminal of the monitoring resistor, and a second terminal connected to the ground pad.

* * * * *